United States Patent [19]
Wright

[11] Patent Number: 5,037,224
[45] Date of Patent: Aug. 6, 1991

[54] APPARATUS FOR SUPPORTING AND STABILIZING AN IMPLEMENT

[76] Inventor: Christine A. Wright, 10330 Foothill Blvd., No. 30-A, Cupertino, Calif. 95014

[21] Appl. No.: 338,995

[22] Filed: Apr. 17, 1989

[51] Int. Cl.[5] F16M 11/26

[52] U.S. Cl. 401/48; 15/437; 33/18.1; D19/84

[58] Field of Search 401/48, 6; 33/18.1; 15/437; D19/84

[56] References Cited

U.S. PATENT DOCUMENTS

| | | | |
|---|---|---|---|
| 258,254 | 5/1882 | Schevenell . | |
| 305,568 | 9/1884 | Botsford | 401/48 |
| 317,309 | 5/1885 | Cox | 401/6 |
| 724,687 | 4/1903 | Floren | 401/48 |
| 1,840,191 | 1/1932 | Eubanks | 401/48 |
| 2,178,755 | 11/1939 | Johnson | 15/437 |
| 2,362,992 | 11/1944 | Dentzler, Jr. | 401/48 |
| 2,497,418 | 2/1950 | Schroeder | 15/437 |
| 2,498,105 | 2/1950 | Dolan | 401/48 |
| 3,972,628 | 8/1976 | Stevers | 401/48 |
| 4,037,975 | 7/1977 | Huffman | 15/443 |
| 4,095,906 | 6/1978 | Sackett | 401/48 |
| 4,111,566 | 9/1978 | Kenwell | 401/6 |
| 4,313,585 | 2/1982 | Bricker | 401/48 |

*Primary Examiner*—Richard J. Johnson
*Attorney, Agent, or Firm*—Emily A. Richeson

[57] ABSTRACT

An apparatus is provided for holding and stabilizing an implement for making marks on a substrate, said apparatus comprising an upstanding pedestal; a plurality of legs attached to said pedestal and extending in a substantially horizontal direction therefrom; and means, attached to said pedestal, for gripping an implement.

18 Claims, 4 Drawing Sheets

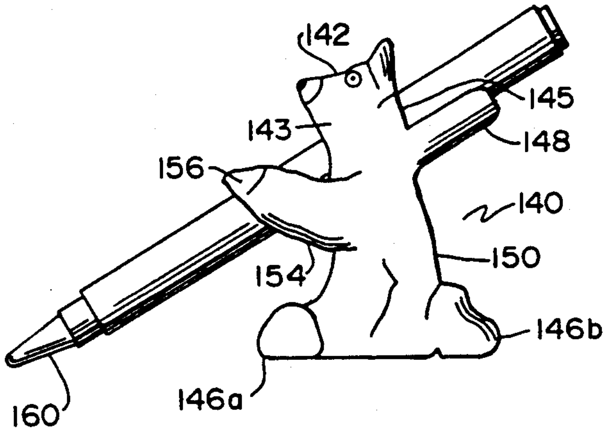
FIG.9
FIG.11
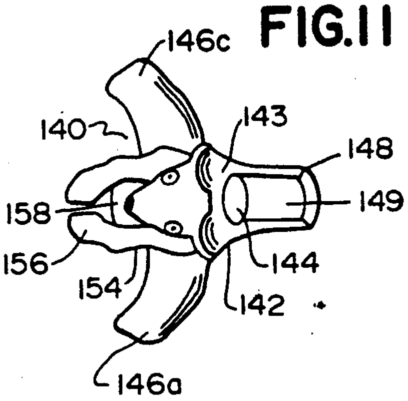
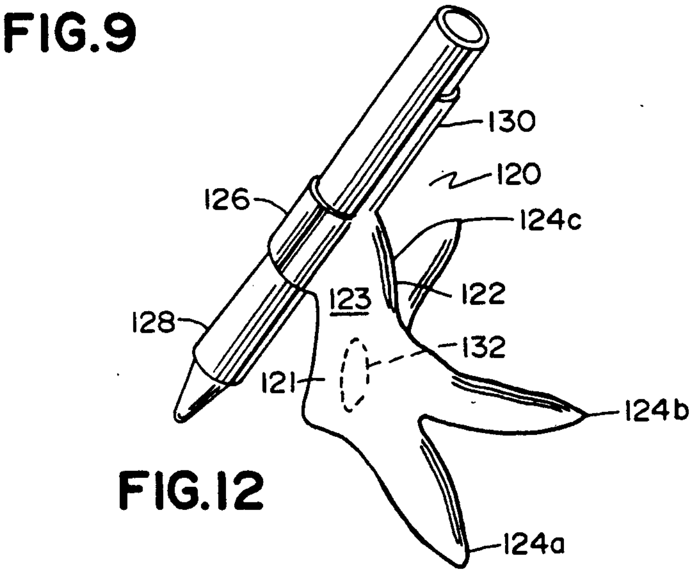
FIG.12
A)
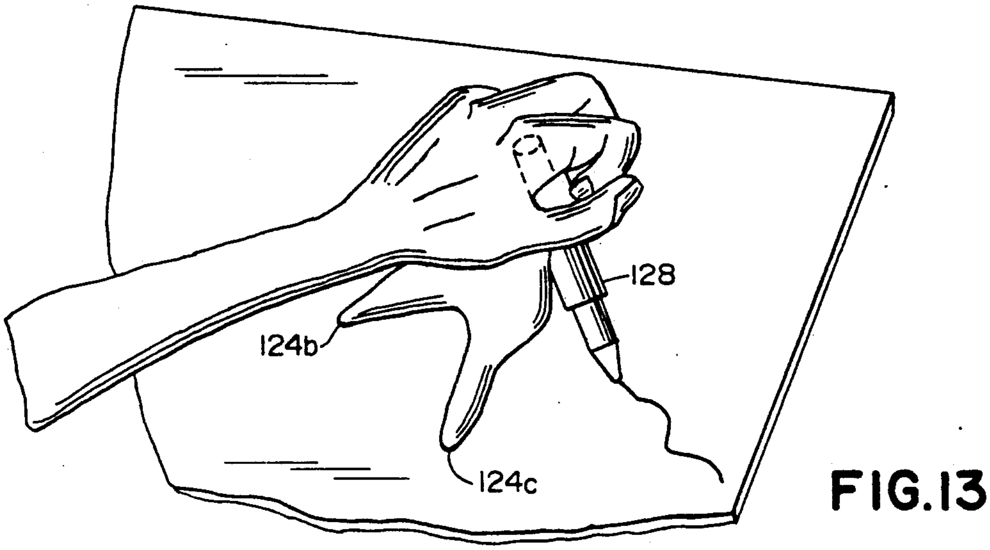
FIG.13

APPARATUS FOR SUPPORTING AND STABILIZING AN IMPLEMENT

BACKGROUND OF THE INVENTION

The present invention relates to apparatus for supporting and stabilizing implements used to make marks on a substrate. More particularly, the present invention relates to apparatus for supporting and stabilizing implements, such as pencils, pens, crayons, charcoal, pastels, felt-tipped markers and brushes, so that a person using the apparatus may engage in activities such as printing, writing, coloring, sketching, drawing or painting.

Many people take for granted their ability to manually pick up an implement such as a pen and apply it to make a controlled mark. However, this simple task is difficult for or is beyond the ability of many people afflicted with a variety of problems, such as arthritis, cerebral palsy, stroke and many other skeletal, muscular, and central and peripheral nervous system problems. Such persons may not be able to execute the prehension patterns required to pick up and hold an object with their fingers. These people may be limited to using a gross grasp with all fingers flexed into the palm and may have limited ability to open the fisted hand. However, a narrow object, such as a writing or drawing implement, often can be grasped in the palm of the fisted hand if the implement is stabilized for the person in a steady, upright position.

Although a variety of different apparatus for supporting writing or drawing instruments have been developed, these apparatus may have disadvantages which are minimized or overcome by the apparatus of the present invention. For example, many devices designed for use by persons with prehension problems have the appearance of adaptive aids, thereby impacting the user's self-esteem. Further, many such devices must be strapped to the user's hand, usually by a therapist or some other person in a caretaking capacity. The user is therefore dependent on someone else to change the implement, such as when a different color of implement is desired. This curtailment of freedom may be particularly troublesome for persons, such as children, who may wish to frequently change implements, for example during a coloring session, and may impede development of a sense of freedom and independence important for people with physical disabilities.

Although a variety of devices exist which do not require strapping to the user's hand, many of these devices have other disadvantages which limit their utility by persons with severe prehension problems or make the devices otherwise undesirable. For example, U.S. Pat. No. 3,972,628 discloses a writing instrument support stand which consists of an upstanding triangular support and a relatively narrow, horizontal base. A writing instrument such as a pen is attached to the hypotenuse of the triangle by means of bonding or clips on the hypotenuse so that the tip of the pen is in contact with a markable substrate such as paper. The person using the stand may grasp the stand in a pincer-type grasp by grasping the triangle between thumb and fingers or by encircling the stand with the thumb and one or more fingers.

Although the device of U.S. Pat. No. 3,972,628 may be useful for people with some disabilities, this device may be difficult for the person with severe prehension problems to grasp. Further, the narrow base makes the device relatively unstable, so that the device is susceptible to being tipped over, such as by uncoordinated hand or arm movements, and may be difficult or impossible for the handicapped user to restore to an upright position.

Another device is disclosed by U.S. Pat. No. 4,095,906. This device consists of a broad, smooth base adapted to be pushed over the surface to be written on, and a writing instrument carrier attached to the base by a hinge. A spring holds the writing instrument a short distance away from the writing surface so that downward pressure from a hand on the instrument carrier causes the writing instrument to contact the surface to be written on.

Although this device may be useful for some people with some disabilities, the device of U.S. Pat. No. 4,095,906 has several disadvantages. The broad base, which provides a modicum of stability, also takes up a substantial amount of room on the writing surface or page, so that simultaneously having several like devices on the writing surface as is desirable during activities such a coloring or other kinds of art work is impractical. Also, this device is limited to being used by sliding over the writing surface, rather than being picked up, and may be difficult or impossible for the person whose hand is spastic or chronically fisted to move and guide.

Other writing or drawing implement supports are disclosed by U.S. Pat. Nos. 258,254; 317,309; 724,687; 1,840,191; 2,362,992; 2,498,105; 4,037,975; and 4,111,566.

People who can not attain normal prehension patterns often also experience inability or difficulty in voluntarily releasing an object from the hand. This difficulty may be compounded by the fact that many known implement support devices are designed intentionally to be lightweight. However, many people with severe prehension problems are able to relax their hand only slightly to release an object. Therefore although lightness may be of an advantage to some disabled users, lightness may make it difficult or impossible for a user with severe prehension problems to voluntarily drop the device. Also, lightweight devices may exhibit an increased tendency to tip over, so that the disabled user is unable to release the device and independently pick it up again at a later time.

An implement support stand which maintains an implement in a stable, upright position so that a person having poor manual coordination or little or no grasping ability in his fingers may readily grasp and release the device and grasp the device again would therefore offer significant practical advantages over many support stands known in the art.

SUMMARY OF THE INVENTION

The present invention is an apparatus particularly adapted to hold and stabilize an implement for making marks on a substrate. This apparatus comprises an upstanding pedestal, a plurality of legs attached to the pedestal, and means, attached to the pedestal, for gripping an implement.

Preferably, an elongate implement support extension is attached to the pedestal and extends therefrom in a generally upward direction. An implement support arm which is attached to the pedestal and extends in a generally downward direction may also be included.

The gripping means, which preferably is capable of removably gripping the implement, preferably includes a hollow, internally substantially cylindrical portion.

Preferably, at least one of the pedestal and the legs are weighted with respect to the rest of the apparatus, so that the tendency of the apparatus to maintain an upright position is improved in comparison to an apparatus of the same configuration which is not weighted.

The legs preferably are attached to the lower portion of the pedestal, and extend in a substantially horizontal direction away from the pedestal. Two or three legs are preferred, with three legs being most preferred.

BRIEF DESCRIPTION OF THE DRAWINGS

FIG. 9 is a side view of an alternative embodiment of the invention wherein the support arm is modified to grip an implement.

FIG. 11 is a top view of the alternative embodiment of FIG. 9.

FIG. 12 is a perspective view, taken from the top, of an alternative embodiment of the invention.

FIG. 13 is a perspective view, take from the top, of a person's hand when engaged in using the embodiment of FIG. 9.

DETAILED DESCRIPTION OF THE INVENTION

The present invention is an apparatus which is particularly adapted for holding and stabilizing an implement such as a pencil, pen, brush, marker, chalk or crayon so that the implement may be moved over a substrate such as paper, cloth, canvas, cardboard, or some other substrate to make a mark.

Figure 1:
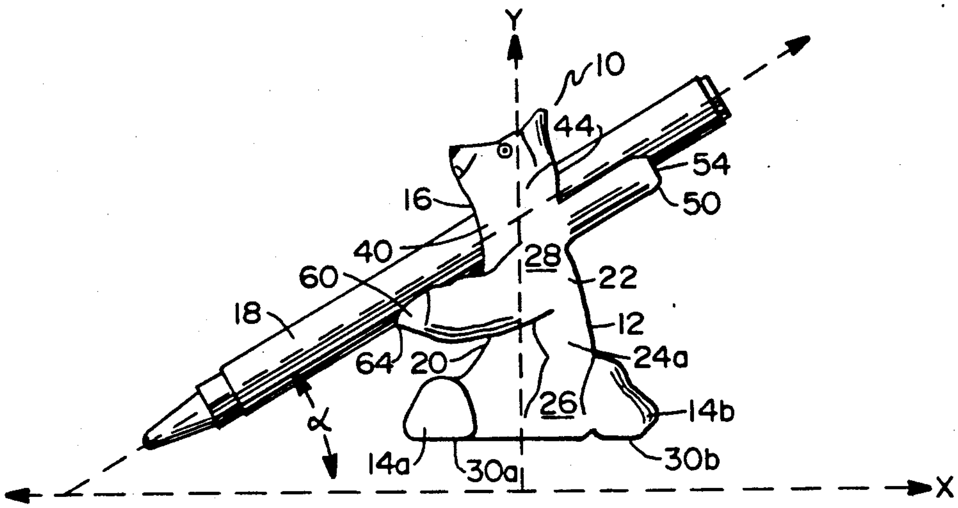
FIG. 1 is a side view of one embodiment of the apparatus of the invention.

Referring to FIG. 1, the apparatus 10 comprises a pedestal 12, a plurality of legs 14*a*, 14*b* and 14*c* (see FIGS. 2, 3 and 4 for 14*c*), and means 16 for gripping an implement 18.

Figure 14:
FIG. 14 is a photograph of several alternative embodiments of the invention and a person engaged in using one embodiment.

Pedestal 12 is oriented so as to be generally upstanding when apparatus 10 is seated on a horizontal substrate such as a table. However, one or more of the front 20, back 22 and left and right sides 24*a*, 24*b*, respectively, (see FIG. 3 for right side 24*b*) of pedestal 12 may be oriented at an angle with respect to vertical axis Y shown in FIGS. 1 and 3, consistent with the invention, so that, for example, the pedestal leans or is curved toward the end of the implement which approximates the substrate (see, for example, the device shown at the lower left of FIG. 14).

Figure 3:
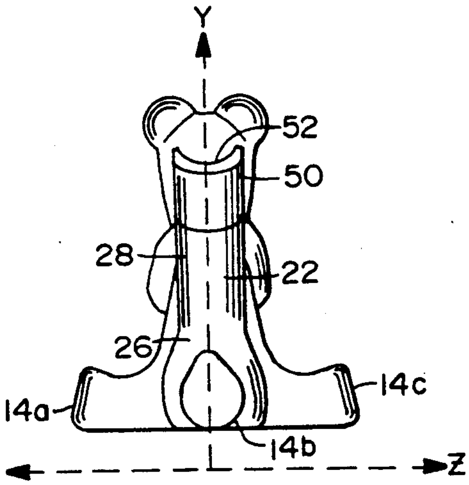
FIG. 3 is a back view of the apparatus of FIG. 1.

The pedestal portion of the apparatus may be of any of a variety of configurations consistent with the invention. For example, the preferred pedestal embodiment depicted in FIGS. 1 and 3 is overall somewhat larger along the X and Z axes through its base portion 26, defined as the lower half of pedestal 12, than it is through its neck portion 28, defined as the upper half of pedestal 12. However, the embodiment shown in FIG. 7 has a pedestal 102 which is substantially columnar; that is, overall the dimensions along the X and Z axes of base portion 101 are roughly the same as those of neck portion 103.

A plurality of legs such as left, rear and right legs 14*a*, *b*, and *c*, respectively, are attached to pedestal 12 and extend in a generally outward direction therefrom. Although the legs may be attached at any place on the pedestal, it is preferred that legs 14*a*, *b* and *c* be attached to base portion 26 of pedestal 12 in order to better accommodate different hand positions of the user.

Figure 2:
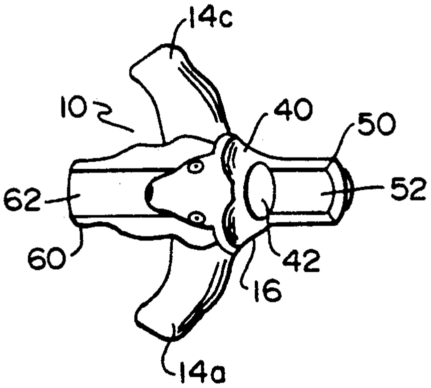
FIG. 2 is a top view of the apparatus of FIG. 1.
Figure 4:
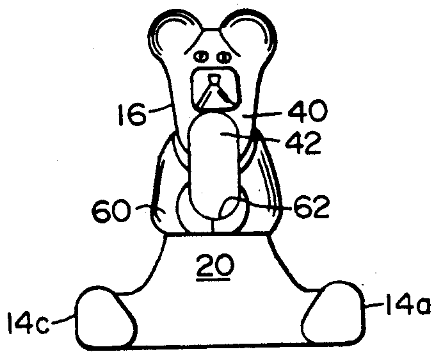
FIG. 4 is a front view of the apparatus of FIG. 1.
Figure 8:
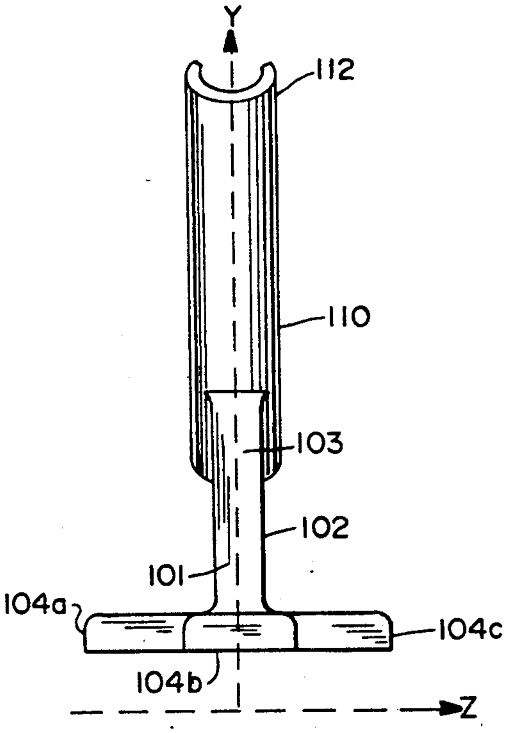
FIG. 8 is a back view of the embodiment of FIG. 7, wherein astop means is absent.

It is preferred that at least two legs be oriented so that they are substantially on opposite sides of the pedestal from each other, such as legs 14*a*, *c* in FIGS. 2, 3 and 4, attached to left and rights sides 24*a*, *b*, respectively, of pedestal 12, and more preferably are oriented so that they are about 110° to about 250° away from each other. It is further preferred that two of the legs be oriented about 120° to about 240° away from each other. For example, FIG. 2 shows legs 14*a* and 14*c* oriented so that they are approximately 240° away from each other, as measured around the back of pedestal 12, and FIG. 8 depicts a device wherein legs 104*a* and 104*c* are oriented approximately 180° away from each other. Additional legs may also be provided, such as third leg 14*b* (sculpted to resemble a tail) shown in FIGS. 1 and 3 attached to back 22 of pedestal 12. A third leg such as leg 14*b* preferably is oriented midway between two other legs, such as legs 14*a* and 14*c*. Bottom surface 30*b* of leg 14*b* preferably is in the same plane as the bottom surface 30*a*, 30*c* of legs 14*a*, 14*c*, respectively.

It is further preferred that at least two of legs 14*a*, 14*b* and 14*c* extend a significant distance away from pedestal 12 in order to provide improved stability and a means of righting the apparatus should it become overturned. As will be readily apparent to those skilled in the art, although legs 14*a*, *b* and *c* may slope downward, at least two of legs 14*a*, *b* and *c* will extend for a significant length in a direction which is substantially horizontal, as defined in FIGS. 1 and 3 by the X and Z axes. This distance may be defined by relating the height of the pedestal such as 12 to the distance between the tips of two of the legs, such as 14*a* and 14*c*. In the preferred embodiment the ratio of this leg span to pedestal height is at least 1.5:1, and more preferably at least 2:1.

Although some increased stability may be provided inherently by the horizontally extending legs of the device and, in the embodiments depicted in FIGS. 1–4 and FIG. 12, by the base portions 26 and 121 being wider than corresponding neck portions 28 and 123 of pedestals 12 and 120, respectively, it is preferred that at least one of the pedestal and the legs include a significant quantity of a material which is of greater density than the material used in much of the rest of the device, so that the center of gravity of the device is in the base portion and/or legs when the apparatus is holding an implement. For example, weight 132 is shown incorporated into base portion 121 of device 120 of FIG. 12. Although the amount of more dense material should be limited so that the device is not so heavy that it is extremely difficult to pick up or would cause damage or injury if dropped, the amount of added weight should be such that the device exhibits an improved tendency to remain in an upright position if tipped or dropped from a small height, such as 2–5 inches, in comparison to a device of the same configuration and construction which does not include the additional weight. Usually an additional weight of about 0.5 to about 1.5 ounces, and more preferably about 0.75 to about 1 ounce, will be sufficient. This additional weight may be provided by a variety of known materials, such as lead shot, for example in the form of fishing weights. This material may be incorporated into the device during manufacturing using known techniques, or may be added later by insertion into the legs and/or pedestal.

Gripping means 16 is attached to neck portion 28 of pedestal 12. It is preferred that the gripping means be one which is capable of removably gripping an implement, so that the implement may be changed to provide the user with a different implement without substitution of an entirely different device.

Although any of a variety of gripping means may be employed consistent with the invention, referring to FIG. 2, gripping means 16 preferably includes a ring portion 40 which is traversed by an aperture 42 of a size and dimension sufficient to permit the introduction of implement 18 therethrough. Due to the fact that the cross sectional configuration of most implements such as pens, pencils, paint brushes, markers and crayons approximates a circle, such as for example many pencils which are hexagonal, it will usually be preferred that aperture 42 be substantially cylindrical, although the gripping means aperture may be of other configurations consistent with the invention.

Referring to FIG. 1, gripping means 16 preferably is constructed so that implement 18, when gripped by the gripping means 16 by insertion in ring portion 40, is at an angle with respect to horizontal axis X, so that the one end of the implement approximates or touches the substrate on which the apparatus rests. This may be accomplished by slanting aperture 42 so that aperture 42 is oriented at an angle with respect to axis X, such as angle alpha shown in FIG. 1. In the embodiment which is preferred, angle alpha will be approximately 30 or more degrees, although angles of 45° or greater are more preferred. Angles of more than 60° generally are not preferred.

Figure 5:
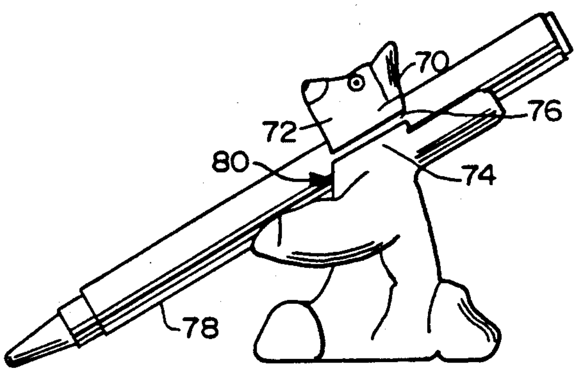
FIG. 5 is a side view of an alternative embodiment of the invention.

Hollow ring portion 40 may grip implement 18 by means of close tolerances between the internal diameter of aperture 42 and the cross section of implement 18, or by other means. For example, ring portion 40 may be made of a resilient material such as an elastomer which will conform to the configuration of the implement so that the implement is gripped. In the less preferred embodiment depicted in FIG. 5, gripping means 70 includes hollow ring portion 72 which includes a resilient material such as an impact modified plastic resin or spring steel. Wall 74 of ring portion 72 is discontinuous at 76, so that introduction of implement 78, which is slightly larger than aperture 80, through ring portion 72 causes wall 74 to act as a clip to hold implement 78 securely in place.

Referring again to FIG. 1, a support extension 50 may also be attached to neck portion 28 of pedestal 12, and preferably is contiguous with gripping means 16. Support extension 50 provides additional support to implement 18 when implement 18 is gripped by gripping means 16 so as to minimize breakage of relatively soft implements such as crayons, and to provide an additional means by which the user may securely grip the device. Extension 50 usually is attached to back side 22 of pedestal 12 and extends at least partly in an upward direction, preferably at the same angle, alpha, as implement 18 held in aperture 42. Support extension 50 preferably is relatively elongate, so that extension 50 preferably extends at least 0.5 inch and more preferably at least 0.75 in., as measured from back side 44 of gripping means 16. However, support extensions longer than about 1.5 inch generally are not preferred.

Referring to FIG. 2, support extension 50 preferably also includes an upper concave surface 52, which preferably approximates the shape of the lower surface 54 of implement 18.

Figure 7:
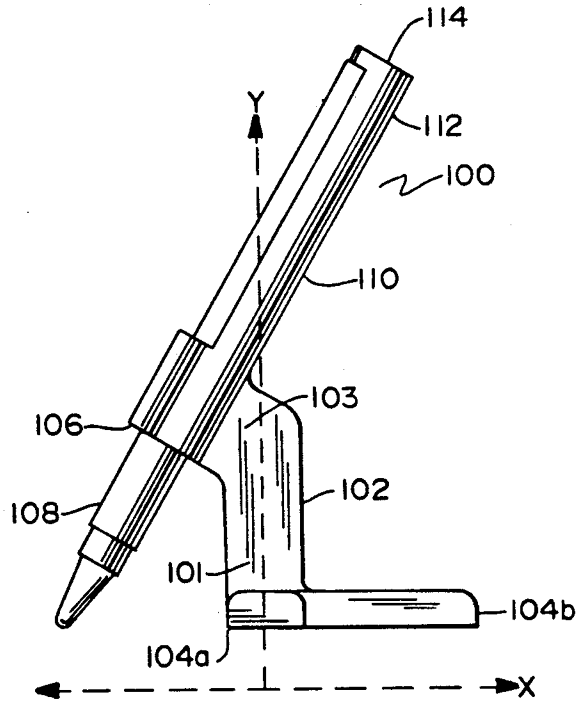
FIG. 7 is a side view of an alternative embodiment of the invention wherein a stop means is present.

FIG. 7 depicts device 100, a less preferred embodiment of the invention, having pedestal 102, legs 104*a, b*, and gripping means 106 holding implement 108. Support extension 110 is equipped at its end 112 distal to pedestal 102 with stop means 114 to prevent implement 108 from being forced upward away from the substrate during use. However, it is preferred that stop means 114 be absent, as shown in FIG. 8 which depicts device 100 from the back, as the presence of stop means 114 limits the length of the implement with which the device may be used.

Figure 6:
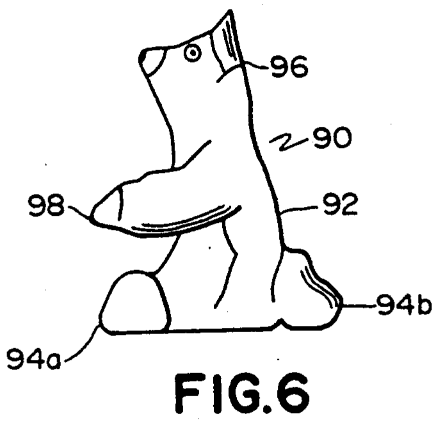
FIG. 6 is a side view of an alternative embodiment of the invention.

Referring to FIG. 1, an implement support arm 60 may be included to assist in supporting and stabilizing implement 18. Support arm 60 preferably is attached to front 20 of pedestal 12, and extends in a generally downward direction from pedestal 12, preferably at the same angle, alpha, as implement 18. Referring to FIG. 4, support arm 60 preferably has an upper concave surface which approximates the shape of lower surface 64 of implement 18 (FIG. 1). FIG. 6 depicts a device 90 which has pedestal 92, legs 94*a*, 94*b* and 94*c* (not shown), gripping means 96 and support arm 98. However, this embodiment is less preferred in that the support extension is absent.

Figure 10:
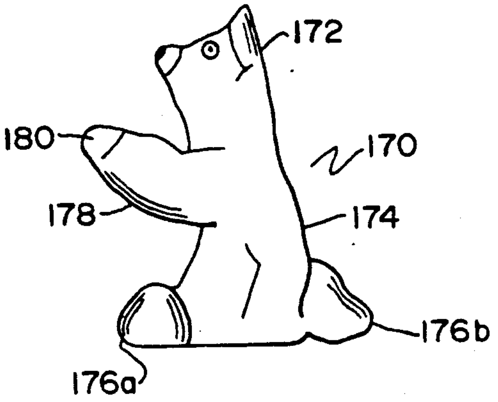
FIG. 10 is a side view of an alternative embodiment of the invention wherein the support arm is modified to grip an implement, but wherein the support extension is absent.

In the alternative embodiment depicted in FIGS. 9 and 11 device 140 has pedestal 150; legs 146*a*, 146*b* and 146*c*; gripping means 142 with ring portion 143 having aperture 144; support extension 148 extending from back 145 of gripping means 142 and having upper support surface 149; and support arm 154. Support arm 154 is modified to include clip arms 156*a* and 156*b* which at least partially encircle implement 160 when implement 160 rests in aperture 144, thereby clipping or exerting a grip on implement 160. Support arm 154 may also include an upper support surface 158 which helps to support implement 160. This embodiment of the support arm may be in addition to the support extension or, as shown in FIG. 10 depicting device 170 having gripping means 172, pedestal 174, legs 176*a* and 176*b*, support arm 178 and clip arm 180, may be used in a device wherein the support extension is absent.

The apparatus of the present invention may be made from a variety of materials using known techniques. For example, the device may be contructed from appropriately cut pieces of self-adhering plastic splinting material, or may be formed in one piece by injection molding of a plastic material. The outer surface may be sculpted or otherwise modified to provide decorative features, such as the bear shown in FIGS. 1–6 and 9–11, and/or may be painted to provide decoration, such as the real and fanciful animals suggested by the painted devices shown in FIG. 14. In this way the apparatus may be given the appearance of a toy or decoration rather than an adaptive device.

An implement such as a pencil or crayon may be attached to the device by introduction of the implement into the gripping means. For example, referring to FIG. 1, implement 18 may be inserted through ring portion 40 so that one end of the implement touches or is proximal to the surface on which device 10 rests.

The apparatus of the invention may be used by both the disabled and physically normal person. People who lack the ability to grasp using normal prehension may use the device, such as the embodiment depicted in FIG. 9, by grasping the device, as shown in FIG. 10, in the fisted hand, so that the top of the implement and/or support extension rests in the user's palm. An alternative means of holding the device by placing the implement and support extension in the user's fisted hand and encircling the implement and/or support extension with the thumb is shown in FIG. 11. With either grasp the apparatus may then be used to mark a substrate by either lifting the device or sliding the device along the surface. In the event the device becomes tipped on its side, the user may right the device by merely pushing down on one of the legs using part of the fisted hand. The other leg or legs thereby act as a lever, causing the apparatus to become upright again.

These and other uses, embodiments and advantages will be readily apparent to those skilled in the art, or may be discovered without undue experimentation. The present invention includes all equivalents and modifications thereof, and is limited only by the following claims.

I claim:

1. An apparatus for holding and stabilizing an implement for making marks on a substrate, said apparatus comprising an upstanding pedestal having an upper neck portion and a lower base portion; said base portion including a plurality of legs adapted for contacting a substrate, said base portion being attached to said pedestal and extending in a substantially horizontal direction therefrom; and means for gripping a drawing implement, wherein said gripping means is located in said neck portion and has a front opening communicating with a back opening, said front and back openings being disposed at a downwardly inclined inclined angle of about 30 to 60 degrees and being positioned entirely above said base portion.

2. The apparatus of claim 1 wherein an implement support extension is attached to and extends in a generally upward direction from said pedestal.

3. The apparatus of claim 2 wherein said support extension has a concave upper surface which approximates the configuration of the lower surface of said implement in the region of said support extension when said implement is gripped by said gripping means.

4. The apparatus of claim 2 wherein said support extension includes a terminal stop means.

5. The apparatus of claim 1 wherein an implement support arm is attached to and extends in a generally downward direction from said pedestal.

6. The apparatus of claim 1 wherein said gripping means includes a hollow ring portion which is traversed by an aperture such that said hollow ring portion is adapted for receiving a marking implement and holding said implement in a position for making marks on a substrate.

7. The apparatus of claim 6 wherein said aperture is substantially cylindrical.

8. The apparatus of claim 6 wherein said hollow portion is made of a resilient material.

9. The apparatus of claim 8 wherein said hollow portion has a wall which is discontinuous.

10. The apparatus of claim 1 wherein said gripping means is capable of removably gripping said implement.

11. The apparatus of claim 1 wherein at least one of said pedestal and said legs are weighted.

12. The apparatus of claim 1 wherein said pedestal includes a base portion and a neck portion and said legs are attached to said base portion.

13. The apparatus of claim 1 wherein at least two of said legs are oriented about 110° to about 250° away from each other.

14. The apparatus of claim 1 wherein said apparatus has at least three legs.

15. The apparatus of claim 14 wherein said third leg is oriented approximately midway between two other legs.

16. The apparatus of claim 1 wherein the ratio of the span of two of said legs to the height of said pedestal is at least 1.5:1.

17. The apparatus of claim 1 wherein said pedestal is substantially columnar.

18. An apparatus for holding and stabilizing an implement for making marks on a substrate, said apparatus comprising an upstanding pedestal having a neck portion and a base portion; said base portion including at least two legs which are attached to and extend from said base portion in a substantially horizontal direction; a means for gripping a drawing implement, wherein said gripping means is located in said neck portion and includes a hollow, internally substantially cylindrical portion having a front opening communicating with a back opening, said front and back openings being disposed at a downwardly inclined inclined angle of about 30 to 60 degrees and being positioned entirely above said base portion; and an implement support extension, wherein said support extension is attached to said pedestal and extends in a generally upward direction therefrom.

* * * * *